United States Patent Office 3,339,366
Patented Sept. 5, 1967

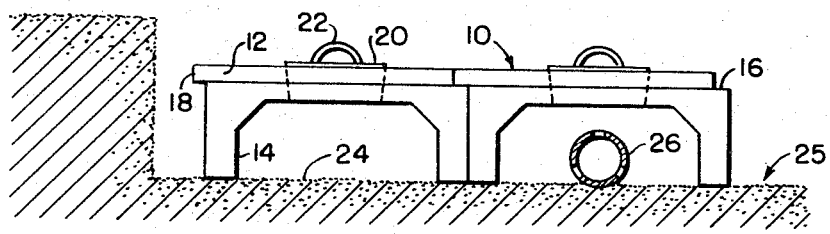
FIG. 2
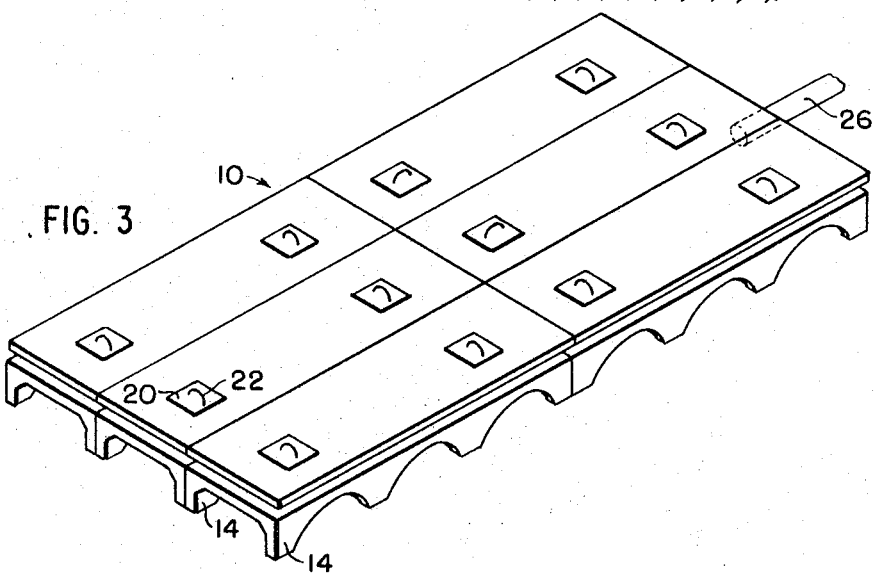
FIG. 3
FIG. 4
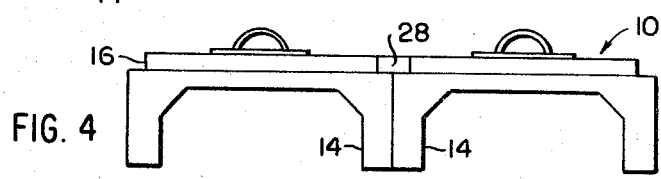
FIG. 5
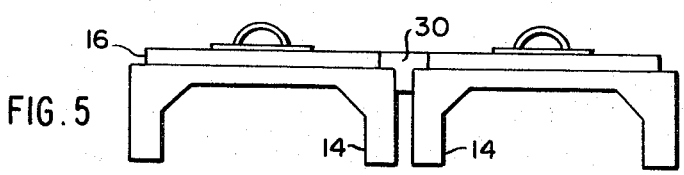
FIG. 6
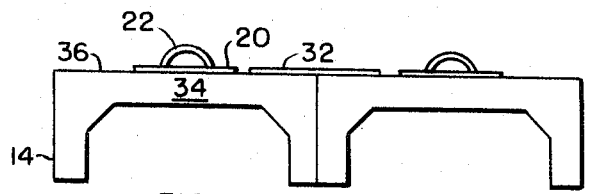

3,339,366
STRUCTURE FOR LEACHING FIELDS
Robert M. Gogan, 105 Coolidge Hill Road, Watertown, Mass. 02172, and Gilbert T. Joly, 75 Hillcroft Ave., Worcester, Mass. 01606
Filed Oct. 20, 1965, Ser. No. 498,590
7 Claims. (Cl. 61—13)

ABSTRACT OF THE DISCLOSURE

A structure for the formation of a covered leaching field is described. The structure is composed of a number of individual distribution chambers of generally rectangular shape placed in side-to-side and end-to-end abutting relationship on the top surface of a percolating bed, the structure being then covered by dirt or other fill. Individual chambers comprise a roof portion having upstanding legs depending from it and forming side walls. The width of the legs in the plane of the side walls is relatively small as compared to the spacing between the legs so that lateral and longitudinal outflow from the chambers along the surface of the percolating bed may take place substantially unimpeded.

---

It is well known that the ideal leaching field is an open area fully exposed to the atmosphere whereby aerobic conditions may be maintained at all times. For obvious reasons, such a field is not practical for use in the vicinity of human habitations and alternative constructions must be utilized. One such alternative consists in the formation of a leaching field below the surface of the ground.

Present methods of constructing leaching fields require the excavation of the field to a depth of approximately three feet for typical fields. A layer of coarse stone is spread over the bottom or "bed" of the field, and a number of porous or open-jointed drainage pipes or conduits are placed on this layer for carrying the effluent materials and for discharging them along the bed. A layer of finely-crushed stone is then placed over the pipes and the coarse stone and the construction of the field is completed by covering the stone with a layer of loam to level off the upper surface of the leaching field to the surrounding area for growing grass or the like. In operation, the effluent material is carried from a central distribution point to each of the distribution pipes from which it filters out along the length of the pipes into the coarse stone and thence into the ground at the bottom and sides of the field.

This type of construction has several disadvantages, however, each of which contributes to decreasing the useful life of the leaching field. It has been found, for example, that the crushed stone used in the leaching field must be thoroughly washed before being distributed in the field; otherwise the dust from the stone filters out toward the bottom and sides of the field and clogs these surfaces, thereby impeding the flow of fluids through the ground. Further, the crushed rock itself occupies a large percentage of the volume of the field, thereby decreasing the void space which is available for the maintenance of aerobic conditions. The volume occupied by the crushed rock also decreases the overload capacity of the leaching field; this becomes especially significant as the field ages, since the absorption rate of this type of field decreases with time.

Accordingly, it is an object of our invention to provide an improved structure for leaching fields in which the use of crushed rock is obviated. Further, it is an object of our invention to provide an improved structure for leaching field in which the structure occupies a smaller volume than the rock which it replaces, thereby providing a larger amount of free air space and an increased overload capacity of the leaching field.

Since all leaching fields ultimately become clogged due to the gradual decrease in absorption capacity caused by chemical reactions forming anaerobic slimes, solids carry-over from the septic tank, infiltration of topsoil, and stone dust sealing among other factors, it is desirable to provide some means of ready access to the leaching field whereby the filtration surface at the bottom of the field may be cleaned of the accumulated scum. In the conventional type of field presently used, the field cannot be cleaned without removing the layers of rock and porous pipe and essentially reconstructing the leaching field. It is another object of our invention, therefore, to provide an improved structure for use in leaching fields having an access passage or passages to permit substantially the entire area of the field readily to be cleaned by scraping, by hydraulic flushing, or by a combiantion of these steps.

Various attempts to improve the construction of leaching fields have resulted in certain modifications of the conventional structure. Thus, for example, one such modification has sought to employ semi-circular pipe sections placed in an inverted position on the bed of the field. This type of construction eliminates the need for rock fill but suffers the serious disadvantage that lateral flow of air and effluent simultaneously is not permitted by the structure; this construction thus fails to approximate the ideal leaching field construction. Accordingly, it is a further object of our invention to provide an improved structure for use in leaching fields which allows a substantially unimpeded free flow of fluid and air simultaneously in both the longitudinal and lateral directions along the bed of the field.

Other and further objects and features of our invention will appear below in connection with the following detailed description of a preferred embodiment thereof which has been selected for purposes of illustration and which is shown in the accompanying drawings in which:

FIGURE 2 is a view in front elevation of a pair of leaching field structures in assembled relation and showing the positioning of the structures in the leaching field;

FIGURE 3 is a view in perspective of a number of structures in assembled relation;

FIGURES 4, 5 and 6 are front elevational views of alternative embodiments of leaching field structures constructed in accordance with our invention

In accordance with our invention, we have devised structures of novel configuration which are adapted to be installed in an excavated area to form a covered space having substantially greater volume than that provided by the conventional rock-filled field of comparable area. The structures are formed from a number of spaced supports resting on the bed of the leaching field and have a roof, preferably flat-topped, resting on top of the supports. One or more "manhole" covers are provided in the roof for access into the open space beneath, in order to provide access to the bed of the leaching field for cleaning purposes. A preferred embodiment of our invention has a "tongue" arrangement on one side of the roof and a groove on the other side to provide a means of interlocking the units in side by side relationship; a similar tongue and groove arrangement may be provided at the ends of the structure to allow a number of structures to be laid end to end. A pipe or other liquid channel carries the effluent material to at least one of the structures, from which it is then distributed by free flow along the bed of the field throughout the remaining structures in the "nest" formed by contiguous structures. A wire-mesh grating is placed along the side walls of those structures which are disposed along the perimeter of the field to prevent infiltration of dirt into these structures through the side walls thereof.

Figure 1:
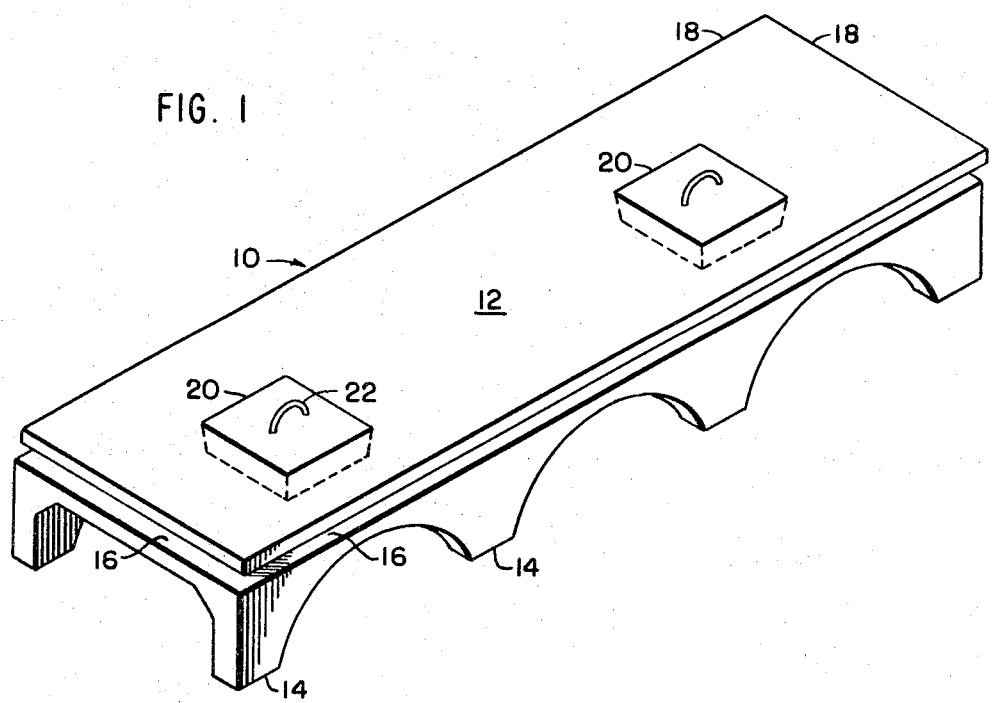
FIGURE 1 is a view in perspective of a leaching field structure constructed in accordance with our invention.

Referring now to the drawings, FIGURE 1 is a view in perspective of a preferred embodiment of a leaching field structure constructed in accordance with our invention. The structure 10 has a roof 12 resting on a plurality of spaced supports 14 which form the side walls and end walls of the structure. As shown in the drawing, these supports are in the form of the pedestals of arches. The roof 12 has an indented segment along two of the edges thereof to form grooves 16 and has an overlapping segment along the other two edges to form tongues 18. The dimensions of the tongues and grooves are such that the tongue of one unit firmly interlocks with the groove of an adjacent unit when the two units are positioned contiguous to each other. This can be seen more clearly with reference to FIGURE 2 which will be described below in more detail. An access cover or "manhole" cover 20 is provided through the roof 12 of the structure to allow access to the interior of the structure for the purposes for cleaning the bed of the leaching field on which the structure is positioned. The cover is lifted by means of a ring 22.

The dimensions of the structure 10 are not critical and may be varied to suit the needs of the user. Similarly, the structure may use any desired material which is capable of supporting the weight of the earth which is back filled over the structure on completing the installation. In general, the structure may advantageously be formed of precast concrete, suitably reinforced if desired, having dimensions of the order of four feet in width, thirteen feet in length, and eighteen inches in height.

It will be noted that the flat-top design and modular spacing of the post or pedestals 14 provides side walls that are substantially unobstructed and which allow a relatively unimpeded lateral flow of effluent material and air simultaneously. The importance of this feature will become more readily apparent by reference to FIGURE 2 and its accompanying detailed description.

FIGURE 2 of the drawings shows a pair of the units of FIGURE 1 in side by side assembled relationship. It will be noted that the tongue 18 of one of the structures fits securely into the groove 16 of the other, thereby providing a means for preventing the infiltration of dirt between them and additionally providing a firm unit which will resist shifting or creeping of the structures when they are so assembled. The structures rest on a bed 24 of a leaching field 25; a drainage pipe 26 is extended to one of the structures for supplying the effluent material to the leaching field. The pipe 26 terminates just inside one of the structures 10 as will be more readily apparent from FIGURE 3 of the drawings. The end of this pipe is left open whereby the effluent material may discharge into the structure and thence flow freely along the bed and throughout the remaining structures in the field. It will be understood that a porous pipe may be extended along a row of structures if desired, the effluent material discharging through the walls of the pipes along the length thereof. It will be found, however, that the effluent will be adequately distributed throughout the field by placing the pipe as shown in FIGURES 2 and 3 of the drawings and accordingly a longer run of the pipe is generally not required.

Due to the manner in which we have formed our structures, it will be seen that the effluent material may readily flow laterally (side-ways) through the spaces between the supports and from one structure to another, as well as longitudinally (lengthwise) along the bed covered by the structure. Thus, only an inlet pipe is needed for the distribution of the effluent material over the entire leaching field, the design of the structures of our invention ensuring that the effluent material will flow both longitudinally and laterally along the bed of the entire field. This is in marked contrast to previous structures for leaching fields which restricted either the longitudinal or the lateral flow, or both, to the area covered by the individual structures, thus breaking up the leaching field into a number of segments. Should one of these segments become clogged by accumulated scum, the effluent will not filter through the bed of the field and will instead block the air flow and build up a reservoir of effluent within the isolated segment, since the effluent will continue to be supplied to this segment; this creates a potential unhealthy condition. In our structures in contrast, should the area enclosed by one or more of our structures become clogged, the effluent will merely flow over the bed of the field within these structures to those remaining areas of the field which are not clogged. Further, the use of a single inlet pipe or channel to distribute the effluent results in a saving on the cost of materials: this saving can become significant if a large leaching field is required.

After the structures have been set in place on the bed of the leaching field and the pipe 26 has been placed as shown in FIGURE 2, the structures are covered with dirt, sand, or other filler material, and the upper surface of the field is smoothed off to match the adjacent area. It will be noted that no crushed rock is required in the field, since our structures are of such design as to provide, in effect, a single chamber throughout the whole area of the field. This factor also contributes to the cost savings made possible by our structures.

The provision of access passages into the interior of the structures allows the bed of the leaching field to be cleaned of accumulated scum by raking or otherwise without removing the structures and without removing the entire layer of top fill material; one need only remove the fill material in the area of the covers 20. By thus revivifying the leaching field, its life may be prolonged indefinitely.

FIGURE 3 shows a cluster of six of the structures of our invention fitted together in both side to side and end to end relation and illustrating the compact unit formed when the structures are so assembled. It will be noted that only a single pipe 26 is shown, this pipe extending from the source of the effluent to one of the assembled structures. Although a plurality of pipes may also be used with the structures of our invention if desired, one or more pipes being placed longitudinally in each row, it will be found that this is not necessary, since the design of our structures permits both longitudinal and lateral flow of the effluent material over the entire area of the leaching field as is apparent from the drawings.

It will also be apparent that when the structures are assembled as shown in FIGURE 3 and the leaching field is completed by covering the structures with the desired fill material, a large hollow underground chamber is provided above the horizontal surface of the leaching field to provide continuous aerobic conditions throughout the field by means of the free flow of air and effluent. This type of construction comes close to the ideal leaching field which is essentially an open field on the surface of the ground.

As so far described, we have shown a structure with a preferred form of locking arrangement to prevent the infiltration of dirt between the structures. Other forms of locking arrangement may be used to perform this function, however, and the design of the structure of our invention may accordingly be modified. These modifications will be described below in more detail with reference to FIGURES 4 through 6.

FIGURE 4 shows an alternative embodiment of a structure made according to our invention and having alternate means of interlocking the structures to form a secure cluster and to prevent the infiltration of dirt or other material between them. The construction of the structure shown in FIGURE 4 is similar to that of the structure shown in FIGURE 1 with the exception that an L-shaped groove 16 is formed around all four sides at the top or roof thereof instead of merely around two of the sides as in the structure of FIGURE 1. After the structures 10 have been positioned adjacent to each other, a precast member 28 of concrete or other material which extends along the length of the structure is inserted into the U-shaped groove formed in the roof of the structures to form a tight seal, thus preventing the infiltration of material between the sides thereof. If additional structures are placed end to end, it will be apparent that the U-shaped grooves formed by positioning the ends adjacent to each other may also be fitted with filler pieces in the same fashion. The U-shaped groove may also be filled, of course, with tar or other material to provide a firm seal. This embodiment of the structure of our invention offers the advantage that it eliminates the projecting edges 18 which may be subject to damage in handling and during installation.

In FIGURE 5, the same type of structure as that shown in FIGURE 4 is illustrated. In contrast to the positioning of the structures shown in FIGURE 4, however, the structures of FIGURE 5 are not butted together but are spaced slightly apart. The space between the structure is closed with a T-shaped strip 30 to seal this space. It will be found that this manner of interlocking the structures provides somewhat greater resistance to shifting or creeping or the structures than that shown in FIGURE 4.

FIGURE 6 shows a simple means of sealing the space between adjoining structures. As shown therein, the leaching field structure 34 has a flat roof 36 and flat side walls 14 extending upwardly to the roof. These walls are of the same type as those shown in FIGURE 1; this will be mre readily apparent by reference to FIGURE 7 which is a perspective view of a structure of the type shown in FIGURE 6. The space formed between the structures when two of them are positioned adjacent to each other is covered by a mat 32. This mat may be formed from a stiff material such as concrete or from a more flexible material such as rubber, plastic, or tar paper. This manner of interlocking the structures will be adequate in many cases, although no means of preventing shifting or creeping of the structures is provided.

Figure 7:
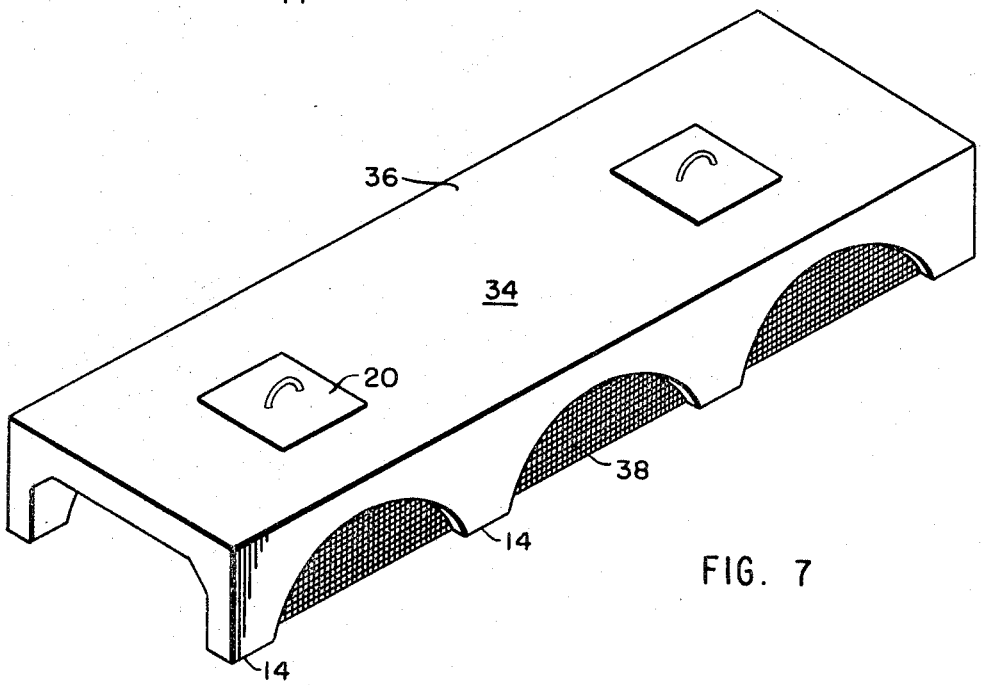
FIGURE 7 is a view in perspective of another embodiment of a structure constructed in accordance with our invention and showing a grating embedded in the sidewall supports of the structure.

FIGURE 7 shows one embodiment of a structure according to our invention which prevents the infiltration of dirt through the sides of the structure when it is placed along the outer edges of the leaching field adjacent to the sides thereof. The structure of FIGURE 7 is of the type shown in FIGURE 6 and described in the accompanying description thereof; accordingly, it will not further be described here in detail. The structure 34 has screening 38 inserted on the inside of one of the side walls formed by the pedestals 14. The screening 38 may be of copper, plastic, or other suitable material and has a mesh that is sufficiently fine to prevent dirt or other material from passing through but which allows the effluent material and air to pass freely through it. A mesh size of 1/16 to 1/8 inch will be found adequate for this purpose. The screening may also be inserted at one end of the structure 34 if the end is also positioned against the perimeter of the leaching field. If the structures are to be used end to end in a trench, the screening will, of course, be inserted on both sides of the structures and at the outside ends of the first and last structures in the row.

Although the screening has been shown and described as being placed on the inside of the side walls of the structure, it is apparent that it may instead be placed on the outside thereof or positioned within the arches intermediate the inside and outside surfaces. If desired, the screening may be cast in place with the structure 34. It will be apparent, of course, that the screening may also be used with any of the other structures herein described.

From the above it may be seen that we have provided a simple yet efficient structure for use in constructing leaching fields. The structure is readily manufactured and when several structures are clustered together, a hollow chamber of large area is formed underground which permits continuously aerobic conditions to be maintained throughout the leaching field and which provides maximum volume to handle temporary peak flow conditions. The effluent material may be distributed throughout the entire field by means of a single pipe terminating a few inches inside one of the structures due to the provision for longitudinal and lateral flow. The elimination of crushed rock or similar expensive fill ensures both greater economy in installation as compared to conventional fields and much greater available free air space to give a higher overflow capacity for the completed leaching field. The provision of access openings to the interior of the chamber permits cleaning of the bed of the field when required and thus extends the lifetime of the field indefinitely. The interlocking means we have provided allows the structures to be closely grouped together in a compact and relatively rigid unit and prevents the infiltration of dirt or other material between units, while the screening or mesh at the sides keeps out dirt which would otherwise infiltrate the structures from the side walls of the excavation.

It will thus be seen that the objects set forth above, among those made apparent from the preceding description, are efficiently attained in a construction which may economically be manufactured and installed. It will be recognized that changes may be made in the disclosed constructions without departing from the scope of the invention, and it is therefore intended that all matter contained in the above description and shown in the accompanying drawings shall be considered as illustrative and not in a limiting sense.

Having described our invention, we claim as our invention:

1. A structure for the distribution of effluent materials over the top surface of a porous percolating bed, said structure comprising a plurality of discrete distribution chambers nested together in abutting relationship on the top surface of said porous bed to form a substantially continuous horizontal roof over said bed, each chamber comprising a plurality of spaced, vertically upstanding pedestals for positioning on said percolating bed and forming walls supporting a horizontally extending closed roof which is impervious to the admission of liquids when said chamber is positioned on said percolating bed, adjacent pairs of pedestals forming fluid passages extending through said walls adjacent the surface of said percolating bed and communicating between the interior and exterior of the respective chamber, the width of each of said passages as measured in the plane of its respective wall at the bottom thereof along said surface being greater than the width of each of said pedestals of said pair of pedestals of the respective passage as measured in a corresponding direction in said plane at the bottom thereof along said surface, the corresponding passages in each adjacent chamber being aligned with each other when said chambers are placed in nested relationship to form a plurality of continuous fluid channels extending throughout said field beneath said closed roof portion, whereby said effluent material may flow out from the interior of each said chamber through said fluid passages and along the surface of said bed in both the longitudinal and lateral directions substantially unimpeded by said pedestals.

2. The structure defined in claim 1 in which each said distribution chamber is of generally rectangular form and in which said chambers are arranged in both side-to-side and end-to-end abutting relationship to form a substantially continuous sub-surface cavity for the maintenance of aerobic conditions throughout.

3. The structure defined in claim 2 in which each said distribution chamber has an access channel through the roof thereof for providing selective access to the percolating bed whereby said bed may be cleaned when said chamber is positioned in said structure, and means for sealing said channel to form a liquid-impervious roof when said structure is positioned in said field for operation.

4. The structure defined in claim 3 in which said chambers have interfitting tongues and grooves along the top marginal edges of said roof, said tongues and grooves being positioned on opposite edges of said roof, the tongue of one said structure being disposed to fit into the groove of a corresponding structure, whereby said structure may be sealed against the infiltration of dirt.

5. The structure defined in claim 3 in which said chambers have a generally L-shaped groove at the upper portion of said roof and extending around the perimeter thereof, one surface of said groove being substantially parallel to said roof, the other surface of said groove being substantially parallel to said pedestals, the grooves on pairs of said chambers forming generally U-shaped grooves when said pairs are placed in assembled relation, and which further comprises means adapted to fit into said U-shaped grooves to seal said grooves against the infiltration of fill.

6. The structure defined in claim 3 in which relatively flat sheets of material are extended over the roofs of adjoining chambers in the area of the adjacent pedestals of said chambers when said chambers are placed in assembled relation to seal said structure against the infiltration of fill.

7. A distribution chamber for the formation of a subsurface covered leaching field, said chamber comprising a relatively flat closed roof of generally rectangular form, a plurality of pedestals resting on the upper surface of a porous percolating bed and extending downwardly from said roof at the outer perimeter thereof, said pedestals forming vertically upstanding walls supporting said roof above the upper surface of said bed, adjacent pairs of pedestals forming fluid passages extending through said walls adjacent the surface of said bed and communicating between the interior and exterior of said chamber, the width of each of said passages as measured in the plane of its respective wall along said surface being greater than the width of each of said pedestals of said pair of pedestals of the respective passage as measured in a corresponding direction in said planes along said surface, whereby effluent material may flow out from said chambers through said fluid passages in both the lateral and longitudinal direction substantially unimpeded by said walls, said chamber being nestable with similar chambers in both side-to-side and end-to-end abutting relationship to form a substantially continuous structure for placement on the top surface of a percolating bed and having a closed roof portion, an open bottom portion, and substantially unimpeded wall portions spacing said roof from said percolating bed, the fluid passages in adjacent chambers being alignable when nested to form a plurality of continuous fluid channels extending throughout said field from side to side and end to end beneath said closed roof portion.

References Cited

UNITED STATES PATENTS

| | | | |
|---|---|---|---|
| 680,548 | 8/1901 | Sikes | 61—10 |
| 1,698,079 | 1/1929 | Wagner | 210—293 X |
| 2,738,745 | 3/1956 | Harpold | 61—72.1 |
| 2,802,339 | 8/1957 | Fogerty | 61—11 |
| 2,900,083 | 8/1959 | Oliver | 210—293 |
| 3,122,888 | 3/1964 | Boening | 61—11 |
| 3,178,026 | 4/1965 | Christy | 210—293 |

FOREIGN PATENTS

| | | |
|---|---|---|
| 3,945 | 1904 | Great Britain. |
| 16,232 | 1912 | Great Britain. |

EARL J. WITMER, *Primary Examiner.*